3,137,726
PREPARATION OF β-ALANINAMIDE
Ralph H. Beutel, Newark, N.J., assignor to Merck & Co., Inc., Rahway, N.J., a corporation of New Jersey
No Drawing. Filed Dec. 19, 1961, Ser. No. 160,656
5 Claims. (Cl. 260—561)

This invention relates to an improved method of preparing β-alaninamide.

More particularly, it is concerned with the process of preparing β-alaninamide by reacting β-aminopropionitrile with sulfuric acid to form β-alaninamide sulfate, and converting said sulfate derivative to the free base.

One method for the preparation of β-alaninamide described in the literature involves the catalytic reduction of cyanacetic acid amide. The second method involves esterifying β-alaninamide and reacting the resulting ester with ammonia. Both of these methods of the prior art are unsatisfactory for the commercial preparation of β-alaninamide since they are difficult to carry out on a commercial scale and result in only poor yields of the desired product.

It is an object of the present invention to provide a process for the preparation of β-alaninamide in high yields which can be conveniently and efficiently carried out on a commercial scale. Another object is to provide a method of converting β-aminopropionitrile to β-alaninamide sulfate whereby this acid salt can be directly recovered in crystalline form. A further object is to provide a process for converting β-alaninamide sulfate to the free base. Other objects will be apparent from the detailed description of this invention hereinafter provided.

In accordance with this invention, it is now found that β-alaninamide can be prepared in high yield by intimately contacting β-aminopropionitrile with sulfuric acid to produce β-alaninamide bisulfate, reacting this intermediate product with an organic base to form β-alaninamide sulfate and reacting this acid salt with ammonia to obtain the free base. Thus, β-alaninamide sulfate is conveniently prepared by intimately contacting β-aminopropionitrile with concentrated sulfuric acid at a temperature of about 90° C. and quenching the resulting reaction mixture by adding it to an organic base such as pyridine, thereby forming the sulfate salt of β-alaninamide. When the reaction mixture is quenched in a mixture of methanol and pyridine, a sulfate salt is precipitated and can be conveniently separated from the solvent mixture in solid form. Although various organic bases can be used in this step, it is preferred to use pyridine since the β-alaninamide sulfate is precipitated in relatively pure form from pyridine solution, and almost all of the impurities, including the pyridinium sulfate, remain in the liquors.

In converting the sulfate salt to the free base by reaction of the ammonia, this step is conveniently accomplished by suspending the sulfate salt in a suitable solvent such as methanol, passing sufficient ammonia to neutralize the sulfate salt, removing the ammonium sulfate thus formed and recovering the free base by concentrating the methanol solution of the base.

In accordance with a preferred embodiment of the present invention, it is found that maximum yields of the sulfate salt are obtained under optimum conditions when the starting material contains between about 10 and 12% of water. Although the reaction can be effected with β-aminopropionitrile containing up to about 25% of water, it is found that materials with a water content in excess of about 15% result in low yields of poor quality product. The use of β-aminopropionitrile containing less than about 10% of water results in the production of lower yields of the desired β-alaninamide sulfate.

The β-alaninamide produced in accordance with the processes of this invention is useful as an intermediate in the preparation of pantothenamide, a product having pantothenic acid activity and useful as a component in multivitamin compositions. Thus, β-alaninamide can be reacted with pantoylactone in methanol and the resulting reaction mixture allowed to stand at room temperature for sufficient time to complete the formation of pantothenamide.

The following examples illustrate methods of carrying out the processes of the present invention.

*Example 1*

To 500 ml. of concentrated sulfuric acid is added 252 g. of β-aminopropionitrile over a period of about one half hour. During this addition, the temperature is kept below about 60° C. with external cooling. The reaction mixture is heated to about 90° C. for two hours. It is cooled to about 60° C. and then quenched by adding it slowly to a mixture of 1570 ml. of pyridine and 1920 ml. of methanol precooled to 5° C.; the temperature being kept below about 55° C. during the addition. The mixture is then cooled to 0–5° C., aged for about two hours and the precipitated crystalline alaninamide sulfate filtered off and washed with 175 ml. of methanol. The alaninamide sulfate so obtained melted at 179–183° C. after drying.

The alaninamide sulfate is added to 3.6 l. of methanol. Anhydrous ammonia is then passed into the methanol keeping the temperature below about 35° C. with external cooling. Sufficient ammonia is added to make the solution basic to alkacid paper. The resulting reaction mixture is aged for one half hour while it is cooled to room temperature. The precipitated ammonium sulfate is filtered off; the filter cake being washed with 3 x 250 ml. of methanol. The filtrate and washings are concentrated under reduced pressure at a temperature below about 40° C., the residue being flushed with 400 ml. of methanol to remove any remaining ammonia. After concentration the β-alaninamide is recovered in the form of an oily residue.

*Example 2*

To 450 ml. of sulfuric acid is added 256 g. of β-aminopropionitrile containing 10.7% water while maintaining the temperature at 80–85° C. with external cooling. The reaction mixture is heated to 90° C., aged for two hours, cooled to 60° C., and then quenched by adding it slowly to a mixture of 1400 ml. of pyridine and 1700 ml. of methanol precooled to 0–5° C. During the addition of the reaction mixture the temperature is kept below 35° C. with external cooling. The mixture is cooled to 0–5° C. and aged for two hours. The crystalline β-alaninamide sulfate which precipitates is recovered by filtration, washed twice with 150 ml. and then once with 300 ml. of methanol and dried to yield β-alaninamide sulfate having a melting point of 182–186° C.

This product is added to 3600 ml. of methanol and 105 g. of anhydrous ammonia passed into the methanol solution while maintaining the temperature at 30° C. or below. The mixture is aged to two hours at room temperature and then filtered to remove the precipitated ammonium sulfate; the filter cake being washed three times with 250 ml. of methanol. The combined filtrate and washes are concentrated at a maximum temperature of 40° C. under reduced pressure. To the residue so obtained is added 400 ml. of methanol and this solvent removed at a temperature of 40° C. under reduced pressure. The resulting residue consisting of β-alaninamide is obtained as an oil free of ammonia.

What is claimed is:

1. A process for preparing β-alaninamide sulfate which comprises intimately mixing β-aminopropionitrile with concentrated sulfuric acid.

2. A process for preparing β-alaninamide sulfate which comprises intimately mixing β-aminopropionitrile with concentrated sulfuric acid, adding the reaction product to pyridine, and recovering crystalline β-alaninamide sulfate from the resulting reaction mixture.

3. A process for preparing β-alaninamide sulfate which comprises intimately mixing β-aminopropionitrile containing 10 to 12% by weight of water with concentrated sulfuric acid, adding the reaction product to pyridine, and recovering crystalline β-alaninamide sulfate from the resulting reaction mixture.

4. A process for preparing β-alaninamide which comprises mixing β-aminopropionitrile with concentrated sulfuric acid, quenching the resulting reaction mixture in pyridine, recovering the precipitated β-alaninamide sulfate, intimately mixing said sulfate with ammonia, removing ammonium sulfate from the resulting reaction mixture, and recovering β-alaninamide.

5. A process for preparing β-alaninamide which comprises intimately mixing β-aminopropionitrile with concentrated sulfuric acid at a temperature not in excess of about 90° C., adding the resulting reaction product to a mixture of pyridine and methanol, recovering the precipitated β-alaninamide sulfate, adding said sulfate to methanol and passing in sufficient ammonia to make the solution basic, removing the precipitated ammonium sulfate, and concentrating the resulting methanol solution to obtain β-alaninamide.

References Cited in the file of this patent

UNITED STATES PATENTS 1,581,621　　Trusler _____ Apr. 20, 1926

FOREIGN PATENTS 597,305　　Germany _____ May 22, 1934

OTHER REFERENCES

Heilbron: Dictionary of Organic Compounds, vol. I, p. 130 (1953).